United States Patent [19]

Detwiler

[11] 4,456,264
[45] Jun. 26, 1984

[54] COMPOUND ARCHERY TARGET

[76] Inventor: Donna Detwiler, 57980 Melissa Dr., Goshen, Ind. 46526

[21] Appl. No.: 424,907

[22] Filed: Sep. 27, 1982

[51] Int. Cl.³ .................................................. F41J 3/00
[52] U.S. Cl. ...................................................... 273/404
[58] Field of Search ......................... 273/403, 404, 408

[56] References Cited

U.S. PATENT DOCUMENTS

| | | | |
|---|---|---|---|
| 1,818,939 | 8/1931 | Brading | 273/403 |
| 2,160,425 | 5/1939 | Thompson | 273/403 |
| 2,818,258 | 12/1957 | Stern | 273/404 |
| 3,048,401 | 8/1962 | Dishon | 273/408 X |
| 3,088,738 | 5/1963 | Meyer | 273/404 |
| 3,367,660 | 2/1968 | Di Maggio | 273/404 |
| 3,762,709 | 10/1973 | Roloff et al. | 273/404 |
| 4,042,240 | 8/1977 | Kinart | 273/404 |
| 4,082,280 | 4/1978 | Lang | 273/408 |
| 4,235,444 | 11/1980 | Meyer | 273/403 |
| 4,244,585 | 1/1981 | Croll | 273/408 |

FOREIGN PATENT DOCUMENTS 2932778  3/1981  Fed. Rep. of Germany ...... 273/404

Primary Examiner—Paul E. Shapiro
Attorney, Agent, or Firm—Robert S. Smith

[57] ABSTRACT

A laminated archery mat which includes a first layer of burlap, a second layer of burlap, a third layer of vinyl, a fourth layer of loose fiberglass scrap material or vinyl, a fifth layer which is a centrally disposed baffle of screening, a sixth layer of loose fiberglass scrap material or vinyl, a seventh layer of vinyl, an eighth layer of burlap, and a ninth layer of burlap. The centrally disposed baffle has one marginal portion cooperating with the marginal portions of the other layers.

6 Claims, 3 Drawing Figures

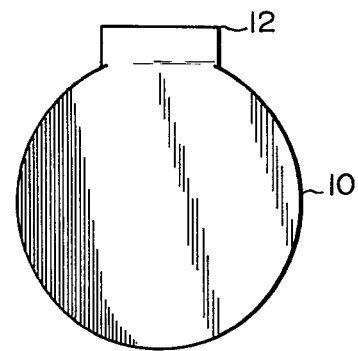
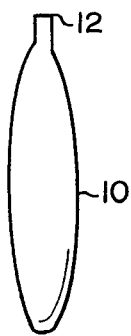
FIG. 1.  FIG. 2.
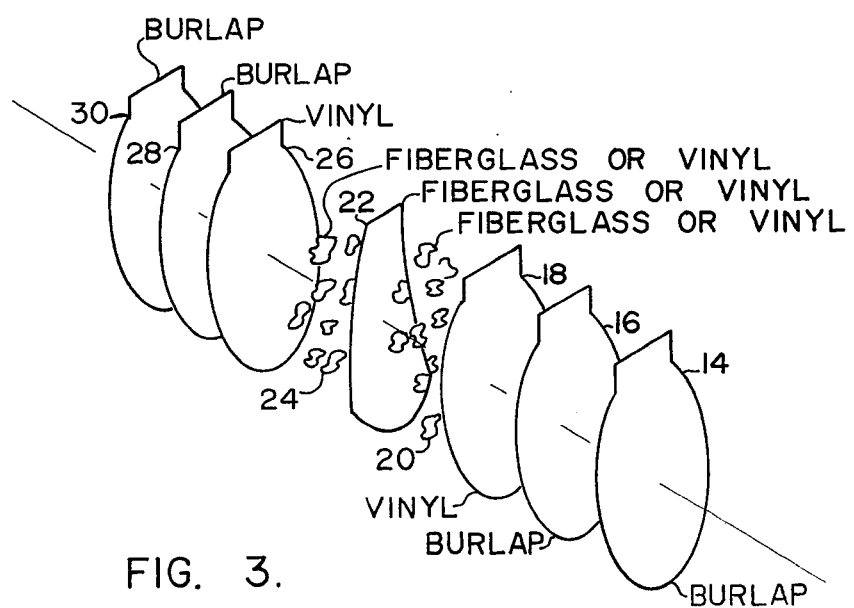
FIG. 3.

COMPOUND ARCHERY TARGET

BACKGROUND OF THE INVENTION

The invention relates to archery targets. Conventional archery targets are formed with a large bulky cover covering a relatively soft object. The target stops each arrow and holds the arrow in place until manually removed.

Targets of this general type having ordinarily been constructed of marsh grass or straw, which has been tightly packed together and tied into a large circular relatively flat pad. Such pads have not been wholly satisfactory because they tend to disintegrate when left out of doors for any substantial period of time and are susceptible to damage due to water from rain and the like.

The prior art includes the apparatus described in U.S. Pat. Nos. 3,048,401, 4,076,246, 4,082,280, 4,235,444, 4,239,573, and 4,244,585.

It is an object of the invention to provide an archery target which will be durable.

It is another object of the invention to provide an archery target which will retain its shape relatively well.

Another object of the invention is to provide a structure which allows easy removal of arrows.

Still another object of the invention is to provide integrally formed means for hanging the archery target in accordance with the invention.

SUMMARY OF THE INVENTION

The foregoing objects and other objects and advantages which shall become apparent from the detailed description of the preferred embodiment are attained in a laminated archery target which includes successive sandwiched layers having a first layer of burlap; a second layer of burlap; a third layer of vinyl; a fourth layer of of loose fiberglass or vinyl scrap material; a fifth layer which is a centrally disposed baffle of screening; a sixth layer of loose fiberglass scrap material; a seventh layer of vinyl; an eighth layer of burlap; and a ninth layer of burlap, the first, second, third, fifth, seventh, eighth, and ninth layers having the marginal edges thereof extending beyond each of the other layers and are stitched together about the marginal edges thereof.

The first, second, third, fifth, seventh, eighth, and ninth layers may each have a necked portion extending from the main extent thereof to define a neck, the baffle may extend into the neck. The neck may be folded over to define a loop for hanging.

BRIEF DESCRIPTION OF THE DRAWING

The invention will be better understood by reference to the accompanying drawing in which:

FIG. 1 is front elevational view of the target in accordance with the invention.

FIG. 2 is a side elevational view of the apparatus illustrated in FIG. 1.

FIG. 3 is a view of the respective layers of the target illustrated in FIGS. 1 and 2 showing the various layers in exploded relationship.

DESCRIPTION OF THE PREFERRED EMBODIMENT

Referring now to FIGS. 1, 2, and 3, there is shown a target 10 in accordance with the invention which has a neck portion 12 which is folded over, as shown in FIG. 2 to provide means for hanging the target 10. The sandwich construction is best shown in FIG. 3 wherein, there is shown a first layer 14 which is preferably of dyed burlap material, a second layer 16 which ordinarily is of raw or undyed burlap material, a third layer 18 which ordinarily is vinyl, and a fourth layer 20 of loose fiberglass or vinyl scrap material. Centrally disposed within the structure is a fifth layer or baffle 22 of fiberglass screen material which has the marginal edges thereof extending beyond each of the other layers to join the layers to the first layer 14.

Disposed on the opposite side of the fifth layer or baffle 22 is a sequence of layers corresponding in reverse order to the layers 14–20. These include a sixth layer 24 of loose fiberglass or vinyl scrap material, a seventh layer 26 of vinyl, an eighth layer 28 of raw burlap, and a ninth layer 30 of dyed burlap. The first, second, third, fifth, seventh, eighth, and ninth layers 14, 16, 18, 22, 26, 28, 30 have peripheral surfaces which are substantially the same size and shape and these peripheral surfaces are stitched together. The fifth layer or baffle 22 is stitched to the first, second, third, fifth, seventh, eighth and ninth layers 14, 16, 18, 22, 26, 28 30 only along the bottom extremity thereof. Each of the layers 14, 16, 18, 22, 26, 28, and 30 have a neck shaped appendage extending upward from the main body thereof to define the neck portion 12.

The first layer 14 and the ninth layer 30 extend through the neck 12. The fifth layer or baffle 22 is provided to hold the bottom of the target 10, to maintain the general shape of the target 10, and also to absorb the impact of the arrows. The target 10 is ordinarily manufactured in an "inside out" manner. This is accomplished by sewing a one half inch seam around the various stitched layers with the neck portion 12 being left open for stuffing. The layers are ordinarily double stitched together with carpet thread or other equivalent material. Thereafter, the stitched layers are turned inside out to place the seams on the inside of the fabrication. Approximately twenty-two pounds of loose fiberglass or vinyl screen scraps are stuffed into the target 10. After stuffing and weighing, the neck portion 12 is folded over so as to form a loop for hanging and hand stitched with the above noted thread. Then the target 10 is further shaped and stored for shipment. Ordinarily the target 10 will be stored in a flat portion to insure that the shape is maintained.

It has been found that the combination of sandwiched layers described herein results in a target which is very durable and which allows easy removal of the arrows disposed therein.

The invention has been described with reference to its illustrated preferred embodiment. Persons skilled in the art may, upon exposure to the teachings herein, conceive variations in the mechanical development of the components therein. Such variations are deemed to be encompassed by the disclosure, the invention being delimited only by the appended claims.

Having thus described my invention, I claim:

1. A laminated archery target which comprises the following:
    a first layer of burlap;
    a second layer of burlap;
    a third layer of vinyl;
    a fourth layer of of loose fiberglass scrap material;
    a fifth layer which is a centrally disposed baffle of screening;

a sixth layer of loose fiberglass scrap material;
a seventh layer of vinyl;
an eighth layer of burlap; and
a ninth layer of burlap, said first, second, third, fifth, seventh, eighth, and ninth layers having the marginal edges thereof extending beyond each of said other layers and being stitched together about the margins thereof.

2. The apparatus as described in claim 1, wherein:
said first, second, third, fifth, seventh, eighth, and ninth layers each have a necked section extending from the main extent thereof to define a neck portion, said baffle extending into said neck portion.

3. The apparatus as described in claim 2, wherein:
said neck portion is folded over to define a loop for hanging.

4. A laminated archery target which comprises the following:
a first layer of burlap;
a second layer of burlap;
a third layer of vinyl;
a fourth layer of of loose vinyl scrap material;
a fifth layer which is a centrally disposed baffle of screening;
a sixth layer of loose fiberglass scrap material;
a seventh layer of vinyl;
an eighth layer of burlap; and
a ninth layer of burlap, said first, second, third, fifth, seventh, eighth, and ninth layers having the marginal edges thereof extending beyond each of said other layers and being stitched together about the margins thereof.

5. The apparatus as described in claim 4, wherein:
said first, second, third, fifth, seventh, eighth, and ninth layers each have a necked section extending from the main extent thereof to define a neck portion section, said baffle extending into said neck.

6. The apparatus as described in claim 5, wherein:
said neck portion is folded over to define a loop for hanging.

* * * * *